United States Patent Office 3,258,509
Patented June 28, 1966

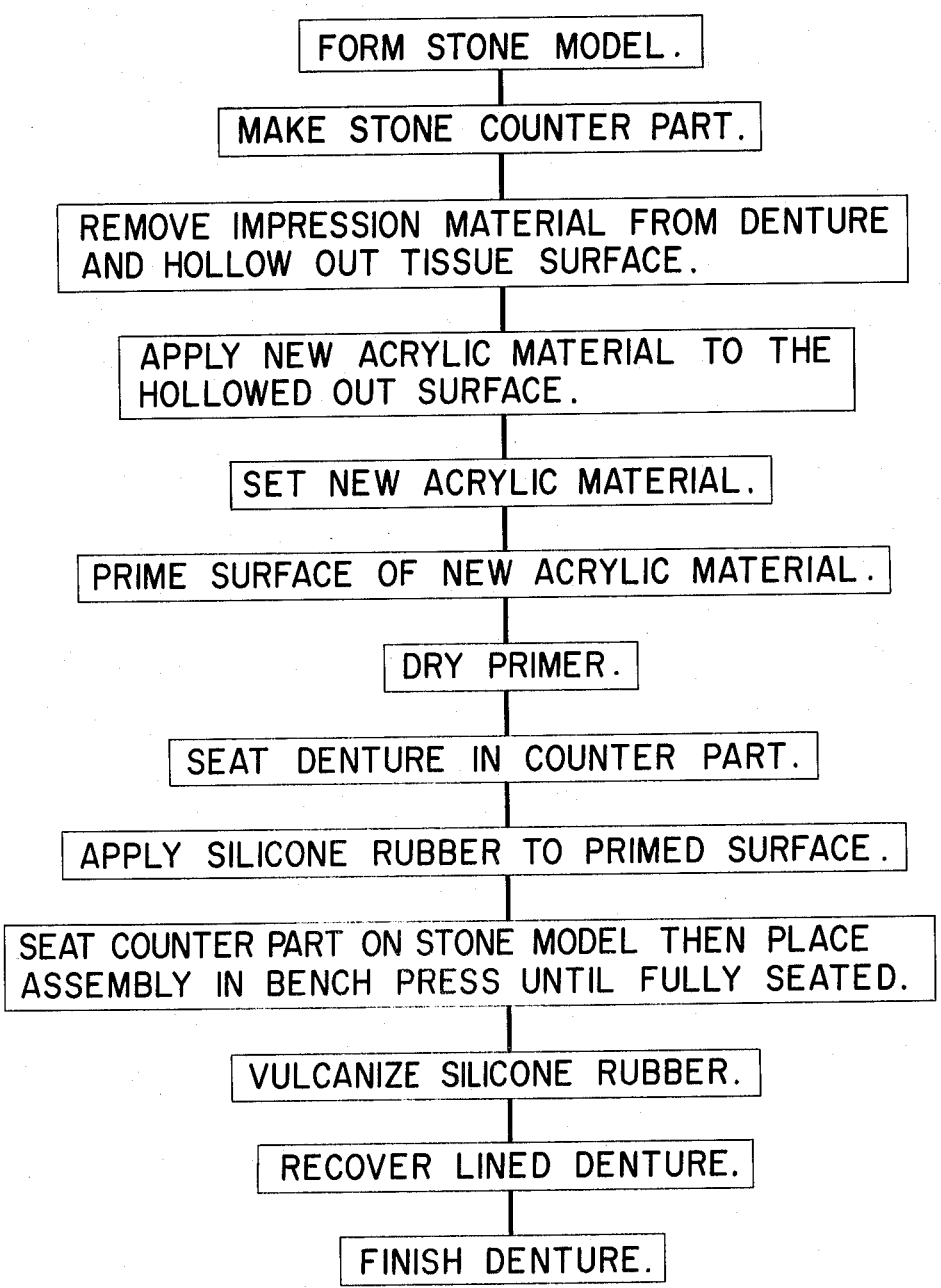

3,258,509
METHOD FOR LINING EXISTING DENTURES
George W. Barnhart, Ogden Dunes, Ind., assignor to Dow Corning Corporation, Midland, Mich., a corporation of Michigan
Filed Jan. 8, 1964, Ser. No. 336,360
2 Claims. (Cl. 264—17)

This invention relates to a method for lining existing dentures with silicone rubber.

There are many people for whom the wearing of dentures is an unpleasant necessity. As pointed out by E. A. Harris in his article, "A Plea for More Research on Denture-Base Materials," which appeared in The Journal of Prosthetic Dentistry, vol. 11, No. 4, pages 673–676, July–August, 1961, this unpleasantness generally is not a result of a poor "fit" but is a question of "comfort." These two terms are in reality not synonymous although denture wearers tend to equate them. In order to make the wearing of dentures more bearable, many owners line their dentures with a resilient material. However, such liners are usually temporary and must be replaced frequently. Examples of cases where resilient liners are particularly useful are: in the complete lower denture where the patient shows a senile atrophy; in developing maximal retention where the residual ridges are bilaterally undercut; in mouths where a hard median palatal raphe is associated with a poor retentive potentiality; in obturators for acquired and congenital clefts of the palate; and where hypersensitivity exists, as in the case of irradiated tissue. Harris stated in the aforementioned article that, "If there was a material for cushioning dentures (similar to the temporary liner) that would retain those soft, compatible properties as long as 1 year, most of the chronic complaints in denture service would be eliminated." The dental profession considers that the essential characteristics of a soft liner should include: (1) insolubility or very little solubility in the mouth environment, (2) adhesion to, and no serious effect on the denture base, (3) permanent softness and resiliency, (4) low water absorption, (5) small dimensional change during processing, (6) ease of cleaning combined with good abrasion resistance, (7) color stability and (8) satisfactory tissue tolerance.

It is an object of this invention to provide a method for lining existing dentures with a permanent silicone rubber lining. Another object is to provide dentures containing a soft, resilient lining which overcomes the disadvantages of the prior art products. Other objects and advantages of this invention will be apparent from the following description, examples and claims.

More specifically, this invention relates to an improvement in a method for lining an existing denture with silicone rubber, including the relining of the denture with new acrylic material, the improvement comprising applying a room temperature vulcanizable silicone rubber to the new acrylic material and then vulcanizing the silicone rubber.

This invention also relates to a method for lining an existing denture with silicone rubber which comprises the steps of (1) Forming a dental stone model,
(2) Making a stone counter part,
(3) Removing the impression material from the denture and hollowing out the tissue surface of the denture,
(4) Applying a thin layer of new acrylic material to the hollowed out denture base surface,
(5) Allowing the new acrylic material to set,
(6) Priming the surface of the new acrylic material,
(7) Allowing the primer to dry,
(8) Seating the denture in the counter part,
(9) Applying a room temperature vulcanizable silicone rubber to the primed surface,
(10) Seating the counter part, containing the denture, on the stone model and then placing the resulting assembly in a bench press until the bottom of the counter part and the floor of the model are fully seated,
(11) Allowing the assembly to remain in the press until the silicone rubber has vulcanized,
(12) Recovering the lined denture, and
(13) Finishing the denture.

This method is illustrated by the flow sheet in the drawing.

The foregoing methods can be more fully detailed and illustrated as follows: A reline impression is taken by the dentist in the conventional manner. Any of the well known impression materials can be employed for taking the reline impression. Examples of such materials include Thiokol rubber base compounds, Iowa impression wax, silicone rubber, alginates, plaster of Paris and a zinc oxide-eugenol paste. The denture is then boxed in wax and a dental stone model formed. The preparation of the stone model can be done by the dentist or at the dental lab. Next a counter part of stone is poured. After the stone counter part has set, the top surface of the counter part and the bottom surface of the model are trimmed so that they are parallel. The denture is then removed from the counter part and model and all the impression material removed from its surface. The tissue surface is then hollowed out using an instrument such as an arbor band or a dental bur. Usually hollowing out to a depth of 1½ to 2 millimeters is sufficient. The hollowed out surface of the denture is then thoroughly cleaned of all residue with a blast of compressed air or a dental chip blower. Extreme care should be taken to see that this surface does not become contaminated. Contaminating this surface with normal skin oils (by touching it with the hands), or rinsing the denture at this point in soapy water or water containing traces of wax can seriously affect the bond between the denture base and the silicone rubber liner. Next a thin layer of new acrylic material is applied to the hollowed out surface. This is done by means of a thin wash of new acrylic material which is a mixture of a self curing denture repair powder and liquid material. The use of two parts of powder to one part of liquid in preparing the mixture has been found to be very satisfactory. The new acrylic material is then allowed to set, generally for 20 to 30 minutes. Then, without touching this new surface (to avoid contamination), the new surface is primed. Only a light even coat of primer is required. The use of excessive quantities of the primer serves no useful purpose. The primer can be applied by any suitable means such as by brushing or spraying it onto the surface. After the primer is applied it is then allowed to dry. There appears to be no critical drying time although between 5 and 15 minutes seems to give optimum results. While the primer is drying the surfaces of the model and counter part are painted with a 10% aqueous solution of a mild detergent, such as Tide or Dreft, which functions as a release agent. Once the primer has dried the denture is seated in the counter part and a room temperature vulcanizable rubber applied to the primed surface. A sufficient amount of silicone rubber is employed so that there is a slight overloading of the space created when the denture was hollowed out. This is done to prevent the trapping of air or the formation of voids. At this point the counter part, containing the denture, is seated on the model and the resulting assembly placed in a bench press until the bottom of the counter part and the floor of the model are fully seated. The excess silicone rubber that squeezes out can be removed with a small spatula. The assembly is allowed to remain in the press until the silicone rubber has set-up. Allowing the assembly to remain in the press overnight is sufficient to accomplish this. When the silicone rubber has vulcanized, the model and denture are separated from the counter part, the model fractured and the lined denture recovered. The denture is then finished with particular attention being paid to the juncture between the acrylic and silicone rubber. Finishing can be done, for example, with an arbor band, berlew disk or mounted abrasive stones and points. Generally speaking, finishing of the silicone rubber liner at the periphery should be done with the highest speed instrument possible and in such a direction that the liner is backed with hard base material.

Instead of the foregoing model-denture-counter part method the procedure can be carried out in a flask. If it is so desired, the vulcanization of the silicone rubber can be speeded-up by placing the flasked denture in a 160–165° F. water bath for about 3 hours.

If the denture to be lined requires a full coverage liner with a soft periphery, the foregoing model-denture-counter part method is not to be used but rather the denture is fully flasked.

Generally speaking, the dentures being relined are made of methyl methacrylate. However, the term "acrylic" as employed herein is intended to cover any of the conventional related denture base materials which are used to make dentures. Such materials are well known to those skilled in the art and are adequately described elsewhere in the literature so no useful purpose would be served by discussing them in detail here.

Any suitable primer can be used to prime the surface of the acrylic material. The purpose of tthe primer is to improve the bond between the acrylic and the silicone rubber. While the use of a primer is not believed to be essential to obtain satisfactory bonding, it is very desirable to employ one. Many suitable primers will be obvious to those skilled in the art. Examples of a few preferred primers are (1) allyltrimethoxysilane, (2) allyltriacetoxysilane and (3) a copolymer prepared from about 90 mol percent methyl methacrylate and about 10 mol percent of

$(CH_3O)_3SiCH_2CH_2CH_2OOCC(CH_3)=CH_2$

The room temperature vulcanizable silicone rubbers that can be employed in making the denture are likewise well known to those skilled in the art and hence will not be discussed in detail here. Either one or two component room temperature vulcanizable silicone rubbers can be employed but the one component rubbers are preferred because they do not require mixing prior to use. Examples of suitable room temperature vulcanizable rubbers are found in U.S. Patents 2,927,907; 3,035,016; 3,061,-567; and 2,833,742. For obvious reasons, only medical grade materials should be employed.

In order that those skilled in the art can better understand how the present invention can be practiced, the following examples are given by way of illustration and not by way of limitation. All parts and percents referred to herein are by weight unless otherwise specified. All viscosities were measured at 25° C. unless otherwise specified.

*Example 1*

An existing full lower denture was lined with silicone rubber as follows: A reline impression was taken by the dentist in the usual manner. The denture was then boxed in wax and a dental stone model formed. A counter part of stone was then poured. When the counter part had set, the top surface of it and the bottom surface of the model were trimmed so that they were parallel. The denture was then removed from the counter part and model and all the impression material removed from its surface. Next, the tissue surface of the denture was hollowed out to a depth of about 2 mm. The hollowed out surface was carefully cleaned with blasts of compressed air. A thin wash of new acrylic material was applied to the hollowed out surface and allowed to set about 30 minutes. A light even coat of primer was applied to the new acrylic surface and allowed to dry about 10 minutes. While the primer was drying, a 10% aqueous solution of Tide was applied to the model and counter part surfaces. Next, the denture was seated in the counter part and a room temperature vulcanizable rubber consisting essentially of 100 parts of a 12,500 cs. hydroxy endblocked polydimethylsiloxane polymer, 40 parts of a 1,000 cs. polydimethylsiloxane fluid, 31.5 parts of a treated silica filler, 9.5 parts of methyltriacetoxysilane, 0.5 part of a pigment paste and 0.2 part stannous oleate was applied to the primed surface. Then the counter part, containing the denture, was seated on the model and the resulting assembly placed in a bench press until the bottom of the counter part and the floor of the model were fully seated. This assembly was allowed to remain in the press overnight which was sufficient time for the rubber to vulcanize. The model and denture were then separated from the counter part, the model fractured, and the silicone rubber lined denture recovered. The denture was then finished employing an arbor band.

*Example 2*

Full lower dentures were lined employing the method of Example 1 except the room temperature vulcanizable silicone rubbers consisting essentially of the ingredients specified below were substituted for the silicone rubber of Example 1.

(1) 140 parts of a 10,000 to 15,000 cs. hydroxy endblocked and partial trimethylsilyl endblocked polydimethylsiloxane polymer, 14 parts of a silica filler, 0.5 part of a pigment paste, 10 parts of vinyltri(methylethyloxime) silane and 0.2 part stannous oleate.

(2) 140 parts of a 10,000 to 15,000 cs. hydroxy endblocked and partially trimethylsilyl endblocked polydimethylsiloxane polymer, 14 parts of a silica filler, 10 parts of methyltriacetoxysilane, 0.2 part stannous oleate and 3 parts of a pigment paste.

(3) 100 parts of a 10,000 cs. hydroxy endblocked polydimethylsiloxane polymer, 40 parts of a 1,000 cs. polydimethylsiloxane fluid, 20 parts of a silica filler and 7 parts of methyltriacetoxysilane.

(4) 100 parts of a 40,000 cs. hydroxy endblocked polymethyltrifluoropropylsiloxane polymer, 15 parts of a 1,000 cs. polymethyltrifluoropropylsiloxane fluid, 13.5 parts of a treated silica filler, 10 parts of methyltriacetoxysilane, 0.25 part of stannous oleate and 3 parts of a pigment paste.

*Example 3*

Full upper dentures as well as partial upper and lower dentures have been lined with silicone rubber employing the method of Example 1 and the silicone rubber compositions of Examples 1 and 2.

That which is claimed is:

1. In a method for lining an existing denture with silicone rubber, including first relining of the denture with new acrylic material, the improvement comprising applying a room temperature vulcanizable silicone rubber to the new acrylic material and then vulcanizing the silicone rubber.

2. A method for lining an existing denture with silicone rubber which comprises the steps of
    (1) forming a dental stone model,
    (2) making a stone counter part,
    (3) removing the impression material from the denture and hollowing out the tissue surface of the denture,
    (4) applying a thin layer of new acrylic material to the hollowed out denture base surface,
    (5) allowing the new acrylic material to set,
    (6) priming the surface of the new acrylic material,
    (7) allowing the primer to dry,
    (8) seating the denture in the counter part,
    (9) applying a room temperature vulcanizable silicone rubber to the prime surface,

(10) seating the counter part, containing the denture, on the stone model and then placing the resulting assembly in a bench press until the bottom of the counter part and the floor of the model are fully seated,
(11) allowing the assembly to remain in the press until the silicone rubber has vulcanized,
(12) recovering the lined denture, and
(13) finishing the denture.

References Cited by the Examiner

UNITED STATES PATENTS

| 2,466,727 | 4/1949 | Morgan | 32—2 |
| 2,617,193 | 11/1952 | Randall | 32—2 |
| 2,851,734 | 9/1958 | Schnell et al. | 264—17 |

FOREIGN PATENTS 572,323 1/1958 Italy.

ALEXANDER H. BRODMERKEL, *Primary Examiner.*

B. SNYDER, *Assistant Examiner.*